United States Patent
Thompson (10) Patent No.: US 11,059,572 B2
(45) Date of Patent: Jul. 13, 2021

(54) LANDING GEAR

(71) Applicant: Airbus Operations Limited, Bristol (GB)

(72) Inventor: Robert Ian Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 612 days.

(21) Appl. No.: 15/997,241

(22) Filed: Jun. 4, 2018

(65) Prior Publication Data
US 2018/0346103 A1    Dec. 6, 2018

(30) Foreign Application Priority Data

Jun. 5, 2017 (GB) ..................... 1708914

(51) Int. Cl.
| | |
|---|---|
| *B64C 25/12* | (2006.01) |
| *B64C 25/62* | (2006.01) |
| *B64C 25/20* | (2006.01) |
| *B64C 25/10* | (2006.01) |
| *B64C 25/34* | (2006.01) |

(52) U.S. Cl.
CPC .............. *B64C 25/20* (2013.01); *B64C 25/10* (2013.01); *B64C 25/12* (2013.01); *B64C 25/34* (2013.01); *B64C 25/62* (2013.01); *B64C 2025/125* (2013.01)

(58) Field of Classification Search
CPC ......... B64C 25/20; B64C 25/10; B64C 25/12; B64C 25/62; B64C 25/58
See application file for complete search history.

(56) References Cited

U.S. PATENT DOCUMENTS

| 1,600,154 | A | * | 9/1926 | Van Vliet | ................ B64C 25/62 |
| | | | | | 244/104 R |
| 3,041,020 | A | | 6/1962 | Willitt | |
| 4,402,477 | A | | 9/1983 | Turiot et al. | |
| 4,422,604 | A | * | 12/1983 | Turiot | ..................... B64C 25/34 |
| | | | | | 244/102 R |

(Continued)

FOREIGN PATENT DOCUMENTS

| CA | 2 823 082 | 3/2014 |
| EP | 0 062 564 | 10/1982 |

(Continued)

OTHER PUBLICATIONS

Search Report for GB1708914.5, dated Nov. 29, 2017, 2 pages.

(Continued)

*Primary Examiner* — Brian M O'Hara
(74) *Attorney, Agent, or Firm* — Nixon & Vanderhye P.C.

(57) ABSTRACT

An aircraft landing gear 2 is disclosed having a first arm 6a configured to have one or more wheels 8a mounted at one end, the first arm 6a being configured for mounting to a pivot 10a. The landing gear 2 includes a second arm 6b configured to have one or more wheels 8b mounted at one end, the second arm 6b being configured for mounting to a pivot 10b. The landing gear 2 further includes a first link 18a pivotally coupled to the first arm 6a, a second link 18b pivotally coupled to the second arm 6b; and a main link 20 pivotally coupled to each of the first and second links 18a, 18b and to a shock absorber 22 arranged to provide a biasing force via (i) the main linkage 20 and the first link 18a which opposes rotation of the first arm 6a about the pivot 10a and (ii) the main linkage 20 and the second link 18b which opposes rotation of the second arm 6b about the pivot 10b.

19 Claims, 10 Drawing Sheets

(56) References Cited

U.S. PATENT DOCUMENTS

| | | | | |
|---|---|---|---|---|
| 4,681,284 | A * | 7/1987 | Veaux | B64C 25/14 |
| | | | | 244/102 R |
| 7,007,891 | B2 * | 3/2006 | Ducos | B64C 25/001 |
| | | | | 244/102 R |
| 8,820,680 | B2 * | 9/2014 | Ferraz | B64C 25/34 |
| | | | | 244/102 A |
| 9,796,468 | B2 * | 10/2017 | Thompson | B64C 25/58 |
| 2011/0031348 | A1 | 2/2011 | Thompson | |
| 2011/0155845 | A1 | 6/2011 | Nannoni et al. | |
| 2013/0068884 | A1 | 3/2013 | Ducos | |
| 2016/0023750 | A1 | 1/2016 | Thompson | |

FOREIGN PATENT DOCUMENTS

| | | |
|---|---|---|
| EP | 2 308 753 | 4/2011 |
| EP | 2 977 316 | 1/2016 |
| FR | 2 185 537 | 1/1974 |
| GB | 767032 | 1/1957 |
| GB | 878385 | 9/1961 |
| GB | 1236923 | 6/1971 |
| GB | 1423895 | 2/1976 |
| GB | 2 094 242 | 9/1982 |
| GB | 2271747 | 4/1994 |
| GB | 2528498 | 1/2016 |

OTHER PUBLICATIONS

Niu, M., "Airframe Structural Design: Practical Design Information and Data on Aircraft Structures" Conmilit Press Ltd., Hong Kong, ISBN 962-7128-04-X, 3 pages.

European Search Report for European Application No. EP18175309, two pages, dated Jul. 11, 2018.

* cited by examiner

LANDING GEAR

CROSS RELATED APPLICATIONS

This application claims priority to United Kingdom (GB) patent application 1708914.5, filed Jun. 5, 2017, the entire contents of each of which are hereby incorporated by reference.

BACKGROUND OF THE INVENTION

The present invention concerns aircraft landing gear. More particularly, but not exclusively, this invention concerns twin arm landing gear and methods of reacting landing gear loads using such a landing gear. The invention also concerns a wing assembly and an aircraft including such a landing gear.

Composites are increasingly used in aircraft in view of their potential to offer weight-saving and thereby increase fuel efficiency. However, many landing gear arrangements are unsuitable for use with composite aircraft structures, for example composite wings and/or fuselages, due to the typically anisotropic load carrying ability of composite structures. This may result in composite materials having a lower load bearing capacity for similar sized structures when compared to metal structures. In particular, composite structures have a more limited capacity to react large point forces that may be transmitted to the airframe by the landing gear on landing. It would be advantageous to provide a landing gear that reduces the maximum load transmitted to any single attachment point on the airframe on landing.

A common landing gear design uses an oleo strut to absorb landing loads and damp oscillations during landing. Oleo struts use both gas and oil, which allows the strut to compress rapidly on landing (because the gas is readily compressible) but with reduced oscillation (because the oil damps movement). However, oleo strut designs typically lead to large point loads on landing that must be reacted by the aircraft structure and may therefore be difficult to use with a composite structure. Oleo struts are also prone to leaks of the gas and/or oil, leading to increased maintenance costs and the compressibility of, for example the gas, will vary with temperature, meaning that the performance of the strut may be temperature dependent.

Integration of the landing gear with an aircraft is not straightforward due to the need to accommodate the landing gear in what is often a limited space. One solution is to make a 'cut-out' in the airframe, but this may not be possible in areas of the airframe that are required to bear significant loads. It would be advantageous to provide a landing gear that facilitates easier integration of the landing gear with the rest of the aircraft.

In order to reduce the stopping distance of an aircraft it is advantageous to apply reverse thrust and/or mechanical breaking as soon as possible after the wheels of the aircraft touch down. For this reason, it would be advantageous to provide a landing gear that allows for the early detection of 'weight on wheels'. Often, movement of the landing gear oleo is used as an indication of weight on wheels. Movement of a landing gear oleo occurs when the breakout load (i.e. the load required to overcome the resistance of any landing gear shock absorber) is exceeded. However, where the oleo is relatively incompressible, it may take a long time for the breakout load to be exceeded during a soft landing. It would be advantageous to provide a landing gear that has a reduced breakout load and/or which is able to provide an early indication of weight on wheels.

GB 2,528,498 discloses an aircraft landing gear comprising a sprung arm mounted to a main pivot and carrying one or more wheels or skids; a plurality of leaf springs and a transfer arm attached to each of the leaf springs. A swinging link has a first end which is pivotally coupled to the sprung arm via a first swinging link pivot and a second end which is pivotally coupled to the transfer arm via a second swinging link pivot. The leaf springs are arranged to provide a resilient biasing force via the transfer arm and the swinging link which opposes rotation of the sprung arm about the main pivot point.

The present invention seeks to mitigate one or more of the above-mentioned problems. Alternatively or additionally, the present invention seeks to provide an improved landing gear.

SUMMARY OF THE INVENTION

The present invention provides, according to a first aspect, an aircraft landing gear comprising a first arm configured to have one or more wheels mounted at one end. The first arm may be configured for mounting to a pivot. The landing gear may further comprise a second arm configured to have one or more wheels mounted at one end. The second arm may be configured for mounting to a pivot. The landing gear may further comprise a first link pivotally coupled to the first arm and/or a second link pivotally coupled to the second arm. The landing gear may further comprise a main link pivotally coupled to each of the first and second links. The landing gear may further comprise a shock absorber arranged to exert a force on the main link. The landing gear may be arranged such that, in use, the shock absorber provides a biasing force via the main link and the first link which opposes rotation of the first arm about the pivot and via the main link and the second link which opposes rotation of the second arm about the pivot. Thus, the shock absorber may bias the main link to oppose rotation of the arms about the pivot.

Using two arms, each of which is connected to the same shock absorber via a linkage as described above, may facilitate the integration of the landing gear into the airframe. For example, the shock absorber may be positioned apart from the arms providing additional flexibility around the layout of the landing gear and/or airframe. The use of two arms may reduce the maximum load that must be reacted at the pivot point, while using the same shock absorber for both arms reduces the number of components involved in the landing gear thereby reducing weight and/or cost. Finally, by altering the shape of the arms and geometry of the linkage described above the landing gear may be tuned to provide a low breakout load (i.e. an early indication of weight on wheels) and/or to reduce the maximum load that must be reacted by the airframe.

Each of the first and second links may be pivotally connected to an arm in the region of the first end of the link. Each of the first and second links may be connected to the arm in the region of, for example at, a first end of the arm. A wheel may be mounted on each arm in the region of, for example at, the second end of the arm. Each of the first and second links may be pivotally connected to the main link in the region of, for example at, the second end of each of the first and second links. The first and second links may be pivotally coupled to the same point on the main (also known as the third) link, for example in the region of, for example at, a first end of the main link. That point may hereafter be referred to as the linkage pivot point. The first and second links may be connected to the main link via the same pivot.

Each of the first link, second link and/or main (third) link may comprise a single link member, for example a substantially rigid link member. The first link, second link and main link may be referred to collectively as the linkage of the landing gear.

The main link may be pivotally coupled to the shock absorber. The main link may be coupled to the shock absorber in the region of a second end, for example at a second end of, the main link.

The linkage formed by the first link, second link and main link may be a swinging linkage. That is to say, the first link, second link and main link may only be connected to the landing gear via their connections to each other and the first arm, second arm and shock absorber respectively. The landing gear may be arranged such that the locus of the linkage pivot point is determined by the movement of the first arm, second arm and the shock absorber. The linkage may be configured to transmit force between the first arm and the shock absorber, and between the second arm and the shock absorber.

Each arm may be a trailing arm wherein the first portion of the arm is angled to the rear relative to the direction of motion of the aircraft on landing such that the ground loads cause the arm to rotate about the main pivot via which the arm is mounted to the aircraft. Each arm may be configured for mounting on a different main pivot located on an aircraft. Each arm may be configured for mounting on a pivot for pivotal movement about a pivot axis. Each pivot axis may be substantially parallel to the pitch axis of the aircraft and/or normal to the forward direction of motion of the aircraft.

Each of the first and second arms may be connected (via the links) to a single shock absorber. Each of the first and second arms may be connected to the same shock absorber. The landing gear may comprise a single shock absorber. The shock absorber may comprise a resilient element, e.g. a spring element. The resilient element may be arranged to deform on application of a landing gear load. The shock absorber may comprise a damper. The damper may be configured to reduce oscillation of the arms (via the linkage) under the action of the landing gear loads. Alternatively, damping may be provided separately from the shock absorber.

The shock absorber may comprise a spring. The shock absorber may comprise a leaf spring, for example a composite leaf spring.

The shock absorber may comprise a plurality of leaf springs, for example a plurality of composite leaf springs. Each leaf spring may be configured for mounting on a pivot (which may be referred to as a spring pivot), for example a pivot connected to the airframe of the aircraft. The plurality of pivots upon which the leaf springs are mounted may be arranged in a straight line. The shock absorber may comprise a transfer arm. Each leaf spring may be coupled to the transfer arm. Each leaf spring may be rigidly or pivotally coupled to the transfer arm. For example a first end of each leaf spring may be connected to the transfer arm. The main link may be coupled to the transfer arm. Thus, the main link may be coupled to the shock absorber via the transfer arm. The shock absorber may comprise a leaf spring support. Each leaf spring may be coupled to the support, for example at a second end of the leaf spring. The landing gear may have only two leaf springs, only three leaf springs, only four leaf springs or more than four leaf springs. One or more of the leaf springs may have a higher stiffness than one of the other leaf springs. Each leaf spring may have a different stiffness to any other leaf spring. Each leaf spring may have a longitudinal axis. The longitudinal axis of each leaf spring may be perpendicular or parallel to the pivot axis of each arm.

The shock absorber may comprise a pneumatic and/or hydraulic shock absorber. The shock absorber may comprise an oleo strut. The oleo strut may be coupled at one end to the main link, and to the airframe at the other end.

Each arm may comprise a first portion extending between the point via which the arm is mounted to the pivot and a wheel (or the mounting point for a wheel). Each arm may comprise a second portion extending between the point via which the arm is mounted to the pivot and a link. The first portion may extend at an angle to the second portion. Thus, the first and second portions may form a bell crank. An included arm angle may be defined between the first portion and the second portion. The included angle may be less than or equal to 180 degrees, for example between 90 degrees and 180 degrees. The length of the first portion may be different to the length of the second portion. Thus, the arm may provide some mechanical advantage. The first portion may be longer than the second portion (or vice versa). The first arm may have a first included arm angle, and the second arm may have a second, different, included arm angle. The included angle of the first arm may be greater than, less than or equal to the included angle of the first arm.

A single wheel may be mounted on each arm. Alternatively, more than one wheel may be mounted on each arm, for example a pair of wheels may be mounted on each arm. The landing gear may comprise more than two arms, each arm being configured to have one or more wheels mounted at one end. The landing gear may comprise only two arms, each arm being configured to have (or having) one or more wheels mounted at one end.

The landing gear may be a retractable landing gear. Thus, in use, the landing gear may be configured to move between a first, deployed, configuration (for use during landing and take off) and a second, retracted, configuration (for use during flight). The landing gear may be configured such that each arm can be retracted by pivoting said arm about the pivot (i.e. rotating the arm about the pivot axis). Alternatively, the landing gear may be configured such that each arm can be retracted by rotating said arm about an axis lying perpendicular to the pivot axis. The landing gear may comprise an actuator configured to retract one or both arms. The actuator may be configured to displace the shock absorber from a first position to a second position spaced apart from the first position. Thus, the landing gear may be configured such that the actuator displaces the shock absorber which in turn (via the linkage) displaces the arms in order to retract the landing gear. Alternatively, the actuator may be configured to act directly on one or both of the arms.

In another aspect of the invention, there is provided an aircraft comprising a landing gear according to any other aspect.

It may be that each arm of the landing gear is configured to retract by rotating about an axis lying substantially parallel to the pitch axis of the aircraft. The landing gear may be configured to move between the first and second configuration by each arm rotating about an axis perpendicular to the direction of motion of the aircraft and/or parallel to the pitch axis of the aircraft.

It may be that each arm of the landing gear is configured to retract by rotating about an axis lying substantially parallel to the roll axis of the aircraft. The landing gear may be configured to move between the first, deployed, configuration and the second, retracted, configuration by each arm rotating about an axis parallel to the direction of motion of the aircraft and/or parallel to the roll axis of the aircraft.

The aircraft may comprise a first pivot and a second pivot upon which the first and second arms are mounted respectively. The first and second pivots may be located on a portion of the aircraft structure. The portion of the aircraft structure on which the first and second pivots are located may be a composite structure, for example a carbon fibre reinforced composite structure. The first and second pivots may be mounted on the fuselage of the aircraft.

The aircraft may comprise a gear beam mounted on the fuselage. The landing gear may be configured such that, in use, each arm is mounted on a pivot on a gear beam (for example the same gear beam or a different gear beam). The gear beam may be mounted to the aircraft at a first, proximal, end. The second, distal, end of the beam may be free to move relative to the aircraft.

It may be that the shock absorber is located further forward than the two arms. The majority of the length of the shock absorber, for example all of the shock absorber may be located forward of the first and second arms. It may be that the shock absorber is located further back than the two arms. The majority of the length of the shock absorber, for example all of the shock absorber may be located forward of the first and second arms.

The shock absorber may be mounted on the aircraft, for example to the fuselage, at a location spaced apart from the arms of the landing gear. The shock absorber may be spaced apart from the arms along the length of the aircraft. This may facilitate integration of the landing gear with the aircraft. It will be appreciated that the increased spacing may be accommodated by varying the geometry of the linkage.

In the case that the shock absorber comprises a plurality of leaf springs, the longitudinal axis of each leaf spring may lie substantially parallel to the yaw axis of the aircraft. Thus, the longitudinal axis of each leaf spring may extend vertically. The longitudinal axis of each leaf spring may lie substantially perpendicular to the yaw axis of the aircraft. Thus, the longitudinal axis of each leaf spring may extend horizontally. Each leaf spring may have a first end located inboard of a second end. Each leaf spring may have a first end located forward of a second end.

The landing gear may be a main landing gear. The landing gear may be a nose landing gear. The landing gear may be mounted to the fuselage or a wing of an aircraft. An aircraft may comprise more than one landing gear in accordance with the present invention. The aircraft may comprise a first landing gear according to any other aspect of the invention, and a second landing gear according to any other aspect of the invention. The first and second landing gear may be located on opposite sides of the aircraft. The main link of each of the first and second landing gear may be connected to the same shock absorber. For example the shock absorber may comprise a leaf spring that extends across the width of the aircraft such that the main link of the landing gear on one side of the aircraft may be connected to one end of the leaf spring, and the main link of a landing gear on the other side of the aircraft may be connected to the other end of the leaf spring.

The aircraft may be a commercial aircraft, for example an aircraft configured to transport more than 50 passengers, for example more than 100 passengers, for example more than 200 hundred passengers or an equivalent cargo load. The aircraft may be a commercial passenger aircraft. The aircraft may be a fixed wing aircraft.

In another aspect of the invention, there may be provided a method of reacting a landing gear load using an landing gear comprising: a first arm having one or more wheels mounted at one end, the first arm being mounted on a first pivot; a second arm having one or more wheels mounted at one end, the second arm being mounted on a second pivot; a first link coupled to the first arm; a second link coupled to the second arm; a main link coupled to each of the first and second links; and a shock absorber coupled to the first and second links. On landing, the shock absorber may act to resist rotation of the first and second arms about the first and second pivots. The shock absorber may act by exerting a force on the arms via the main link, and each of the first and second links.

The landing gear may be configured such that the first arm and the second arm can move independently of each other. The landing gear may be configured such that the first link and the second link can move independently of each other. Thus, on landing, where the load is not distributed evenly between the wheels, for example when a wheel of one arm contacts the ground before a wheel of the other arm, said arm may begin to rotate under the action of the ground loads while the other arm remains stationary. It may be that, on landing, during a first time period one of the first and second arms rotates while the other of the first and second arms remains stationary and then, during a second time period, the second arm rotates. It may be that the first arm is stationary during the second time period. It may be that the first arm rotates during the second time period. Independent movement of the arms may facilitate the early detection of weight on wheels and management of the maximum loads experienced by the landing gear.

In another aspect of the invention, there may be provided a wing assembly comprising a landing gear in accordance with any other aspect.

In another aspect of the invention, there may be provided a landing gear for an aircraft. The landing gear may comprise a first arm and a second arm, each arm being configured for mounting a wheel thereon. The first arm may be pivotally connected to a first link. The second arm may be pivotally connect to a second link. The first and second links may be pivotally connected to a third link. The third link may be biased to provide a force to the first arm via the first link to oppose rotation of the first arm about the pivot and the third link may be biased to provide a force to the second arm via the second link to oppose rotation of the second arm about the pivot.

In another aspect of the invention, there may be provided a landing gear assembly for an aircraft, the landing gear assembly comprising a first landing gear leg for mounting a wheel thereon and a second landing gear leg for mounting a wheel thereon. The second landing gear leg may be being positioned behind the first landing gear leg. Each leg may be mounted for movement to accommodate ground reaction forces on landing. A linkage assembly may be connected to both the first and second landing gear legs such that a common link is configured both to (i) provide a force which opposes movement of the first landing gear leg on landing and to (ii) provide a force which opposes movement of the second landing gear leg on landing. Each leg may be in the form of a bell crank.

It will of course be appreciated that features described in relation to one aspect of the present invention may be incorporated into other aspects of the present invention. For example, the method of the invention may incorporate any of the features described with reference to the apparatus of the invention and vice versa. The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 1:
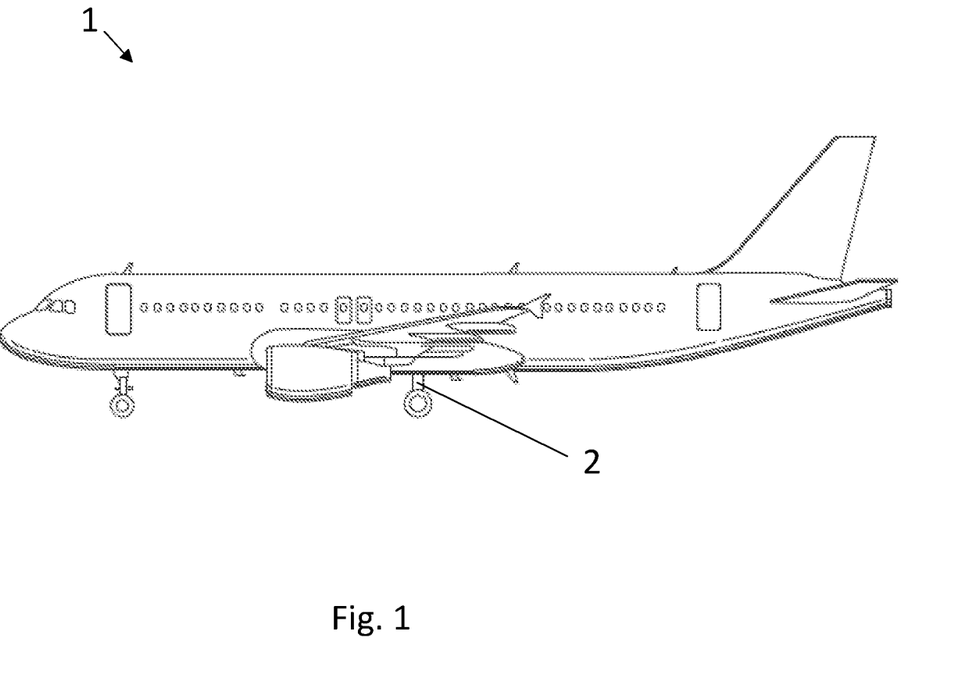
FIG. 1 shows a perspective view of an aircraft comprising a landing gear according to a first embodiment of the invention.

FIG. 1 shows an aircraft 1 comprising a main landing gear 2 in accordance with a first example embodiment of the invention.

Figure 2:
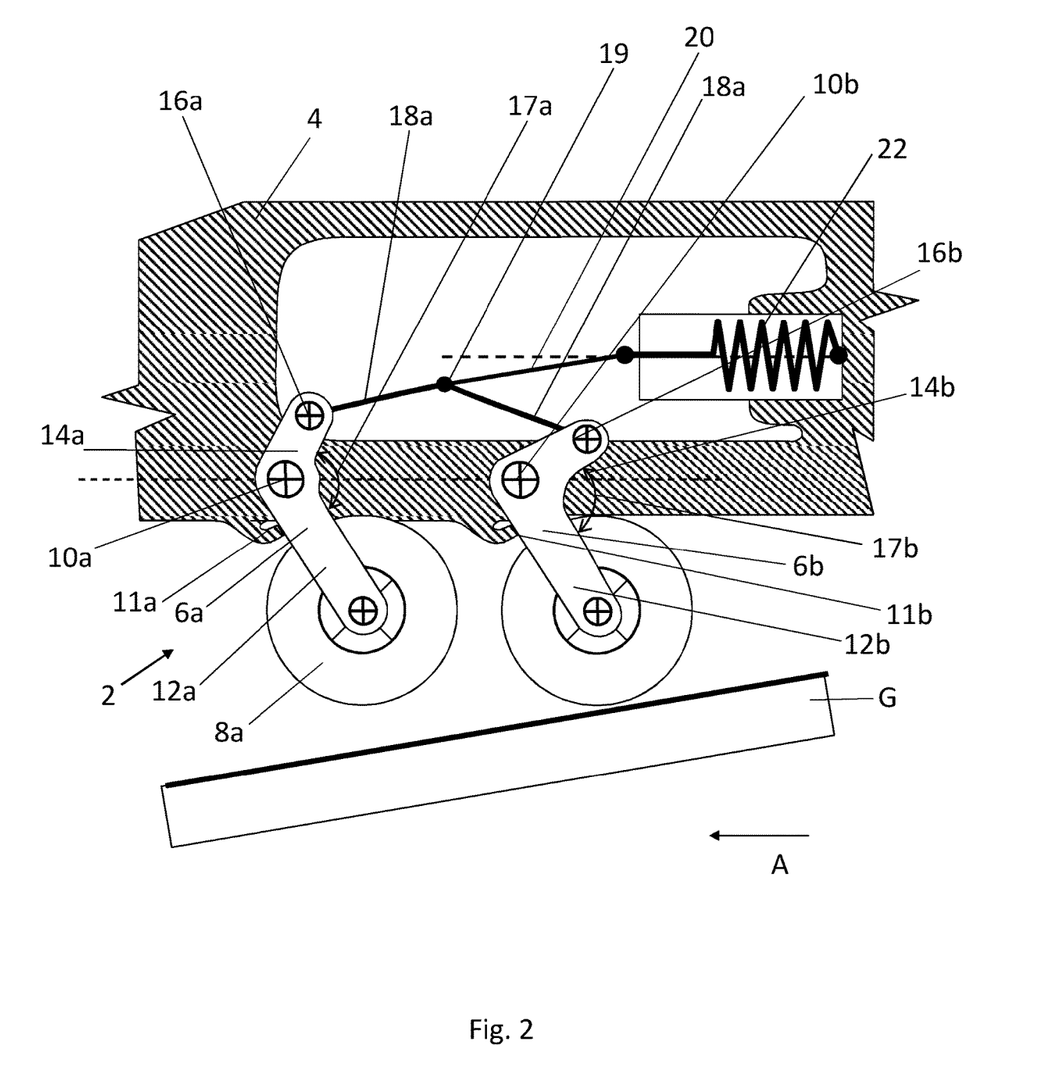
FIG. 2 shows a close up schematic view of the landing gear of the first embodiment.

FIG. 2 shows a close up and schematic view of part of the airframe 4 and the landing gear 2 of the aircraft 1 of the first example embodiment immediately before the aircraft 1 contacts the ground, which is labelled G in FIG. 2. The forward direction of travel of the aircraft 1 is indicated with an arrow labelled A in FIG. 2. The arrow A points to the left in FIG. 2. The landing gear 2 comprises a first arm 6a mounted on a pivot 10a. A first part 12a of the arm 6a extends downwards and rearward (towards the right of FIG. 2) between the pivot 10a and a front wheel 8a. A second part 14a of the arm extends away from the pivot 10a, upwards and to the right of FIG. 2. An included link angle 17a may be defined between the two parts 12a, 14a. A link 18a is connected to the distal end of the second part 14a of the first arm 6a via a pivot 16a. The front of the arm 6a contacts a stop 11a mounted on the airframe 4 forward of the pivot point 10a. A second arm 6b is mounted on a second pivot 10b located to the rear (towards the right of FIG. 2) of the first pivot 10a. Similar to the first arm 6a, the second arm 6b comprises a first part 12b extending downwards and rearward from the pivot 10b to a rear wheel 8b mounted on the lower end of the arm 6b, and a second part 14b extending upwards and rearward from the pivot 10b, giving an included link angle 17b. A link 18b is connected to the distal end of the second part 14b of the second arm 6b via a pivot 16b. The front of the second arm 6b contacts a stop 11b located between the first and second arms 6a, 6b. The first link 18a extends rearward from the first arm 6a, while the second link 18b extends forward from the second arm 6b, the distal end of the two links 18a, 18b meet at a pivot 19 via which they are connected to one end of a main link 20. The main link 20 extends rearward and upward to connect with a shock absorber 22 which is mounted on the airframe 4 of the aircraft 1 with its longitudinal axis substantially parallel to the roll axis of the aircraft 1. In FIG. 2 the ground G is shown inclined at an angle relative to the longitudinal (horizontal) axis of the airframe 4, as may occur when the nose of an aircraft flairs upward on landing. It will be appreciated that FIG. 2 (and the other figures) is not to scale, and that some elements of the landing gear have been omitted for the sake of clarity.

In use, the reaction forces experienced by the wheels 8a, 8b, when the aircraft contacts the ground G will act to rotate each arm 6a, 6b anti-clockwise around the relevant pivot point 10a, 10b. However, the shock absorber 22 will resist this motion, via the main link 20 and each of the first link 18a and second link 18b. When, as shown in FIG. 2, the airframe 4 is inclined relative to the ground G prior to landing the rear wheel 8b will contact the ground first, causing the rear arm 6b to rotate relative to the aircraft 1 while the front arm remains stationary. This movement will initially be accommodated by the links 18a, 18b, 20, and then resisted, via the second link 18b, main link 20 and the shock absorber 22 while the front wheel 8a remains in the air. The movement of either arm 6a or 6b may be used to provide an indication of 'weight on wheels'. The stops 11a, 11b limit the clockwise rotation of each arm 6a, 6b respectively.

The use of two independently moveable arms 6 and a linkage as described above may allow for a reduction in the maximum loads exerted on the airframe 4 by the landing gear 2 during landing; not only is the loading split over the two wheels 8a, 8b (which may contact the ground at different times) and their respective pivot points, but by tuning the geometry of the landing gear, particularly of arms 6 and linking elements 18 and 20, the load experienced by the airframe 4 can be better managed. The offset and/or pitch of the line of action of the shock absorber 22 may also be varied to manage the load experienced by the airframe. Thus, landing gear in accordance with the present embodiment may provide reduced loads for reaction by the airframe and therefore be particularly (but not exclusively) suitable for use with composite materials. The use of two independently moveable arms 6 and a linkage as described above may allow for earlier detection of weight on wheels. Rotation of either arm 6a, 6b may be used as an indication of 'weight on wheels', rather than having to wait for both wheels to contact the ground for the breakout load to be overcome. Further the geometry of the arms 6 and links 18a, 18b and 20 may be varied to provide a low breakout load.

Figure 3:
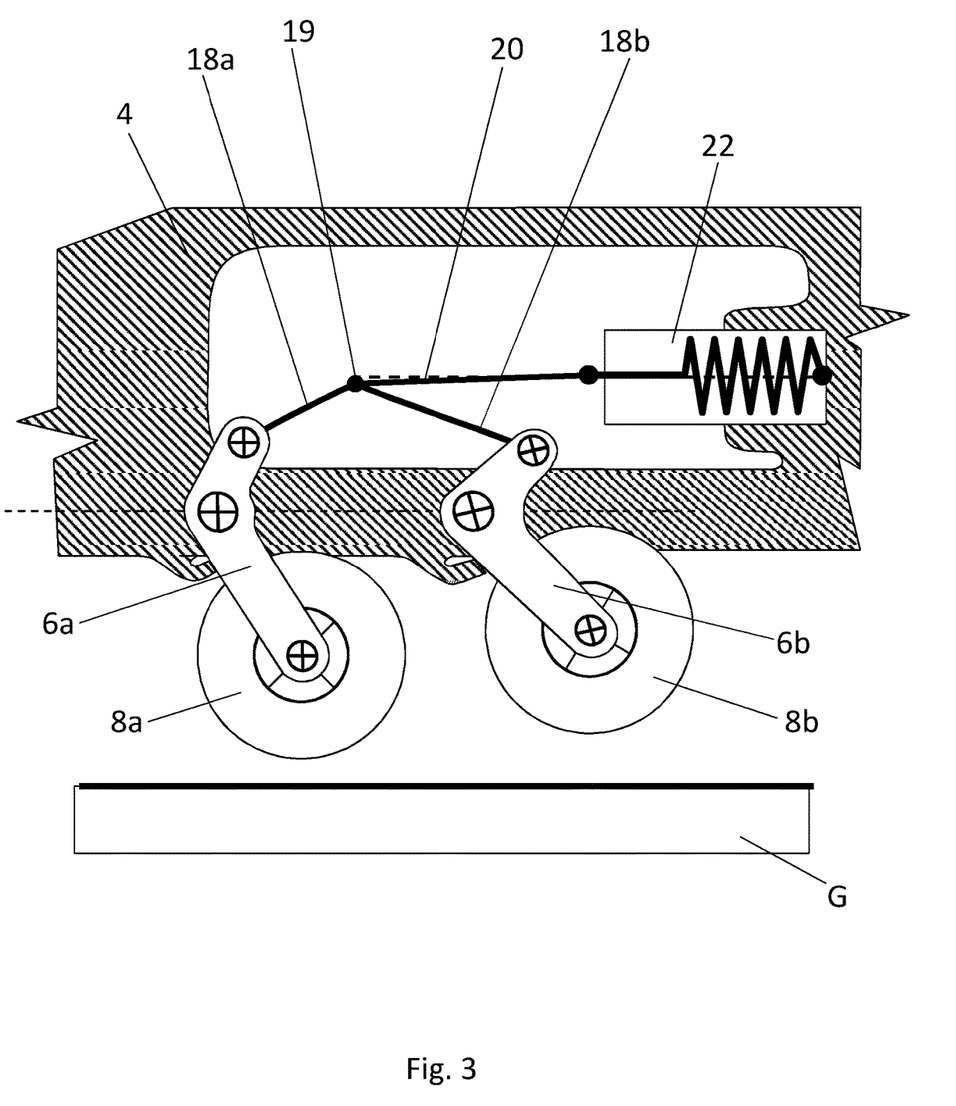
FIG. 3 shows a close up schematic view of a landing gear in accordance with a second example embodiment.

FIG. 3 shows a second example embodiment of a landing gear in accordance with the present invention. Like reference numerals denote like elements, and only those elements of the landing gear of the second embodiment which differ significantly with respect to the first embodiment will be discussed. As in FIG. 2, FIG. 3 shows the landing gear immediately prior to contact with the ground G. In contrast to the landing gear of FIG. 2 where the vertical position of the two wheels 8a, 8b relative to the airframe 4 was the same, in the FIG. 3 embodiment the rear wheel 8b is raised relative to the front wheel 8a. The length of main link 20 is increased in FIG. 3 as compared to FIG. 2, with pivot point 19 located higher up and further forward and the angle of each link 18a, 18b with the corresponding arm 6a, 6b has altered accordingly.

Figure 4:
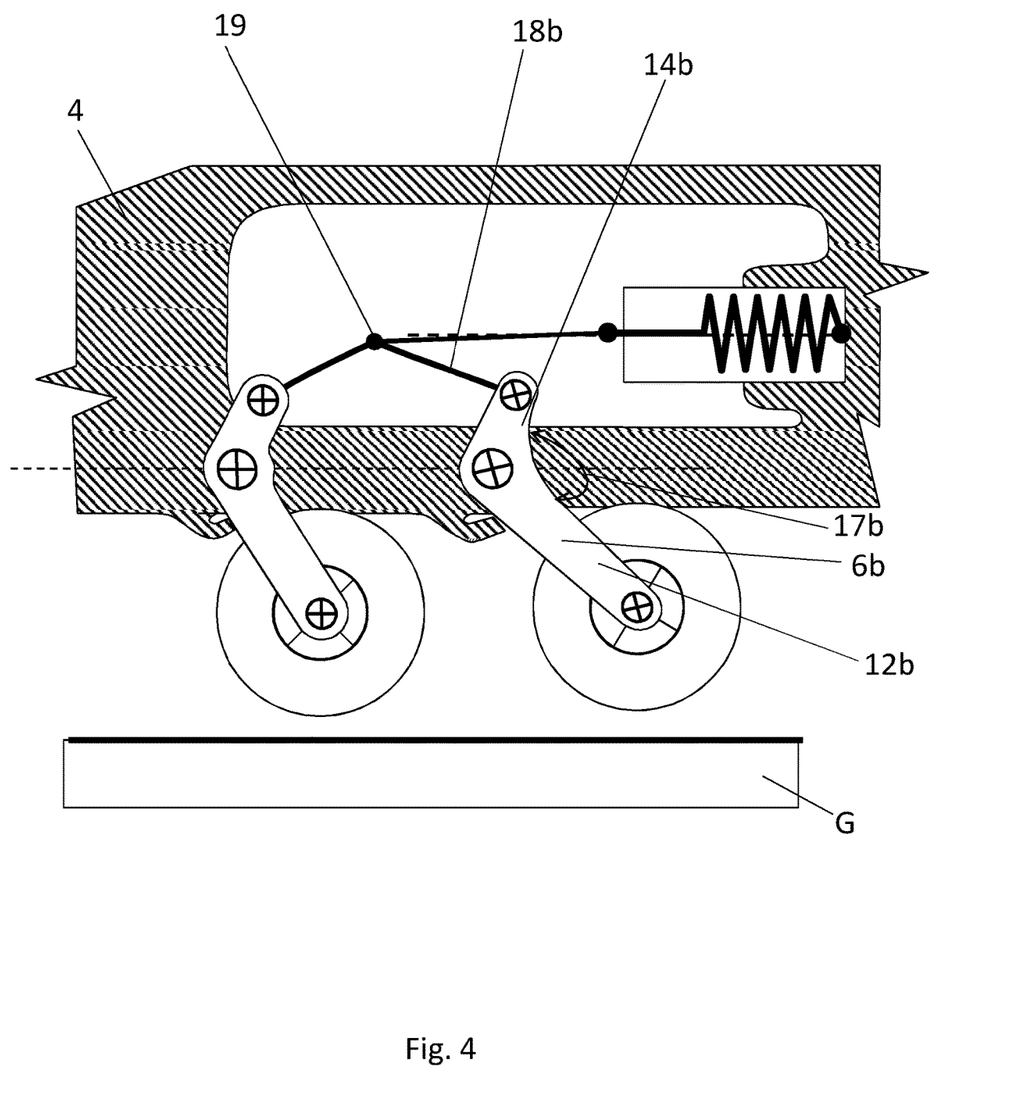
FIG. 4 shows a close up schematic view of a landing gear in accordance with a third example embodiment.

FIG. 4 shows a third example embodiment of a landing gear in accordance with the present invention. Like reference numerals denote like elements, and only those elements of the landing gear of the third embodiment which differ significantly with respect to the first embodiment will be discussed. In FIG. 4 the shape of the second arm 6b has changed; the length of the lower part 12b is increased in comparison to FIG. 2, and the included angle 17b between the upper part 14b and lower part 12b is also increased. The position of the pivot point 19 is substantially the same as in FIG. 2, but the length of the rear link 18b is reduced to compensate for the change in shape of the rear arm 6b.

Figure 5:
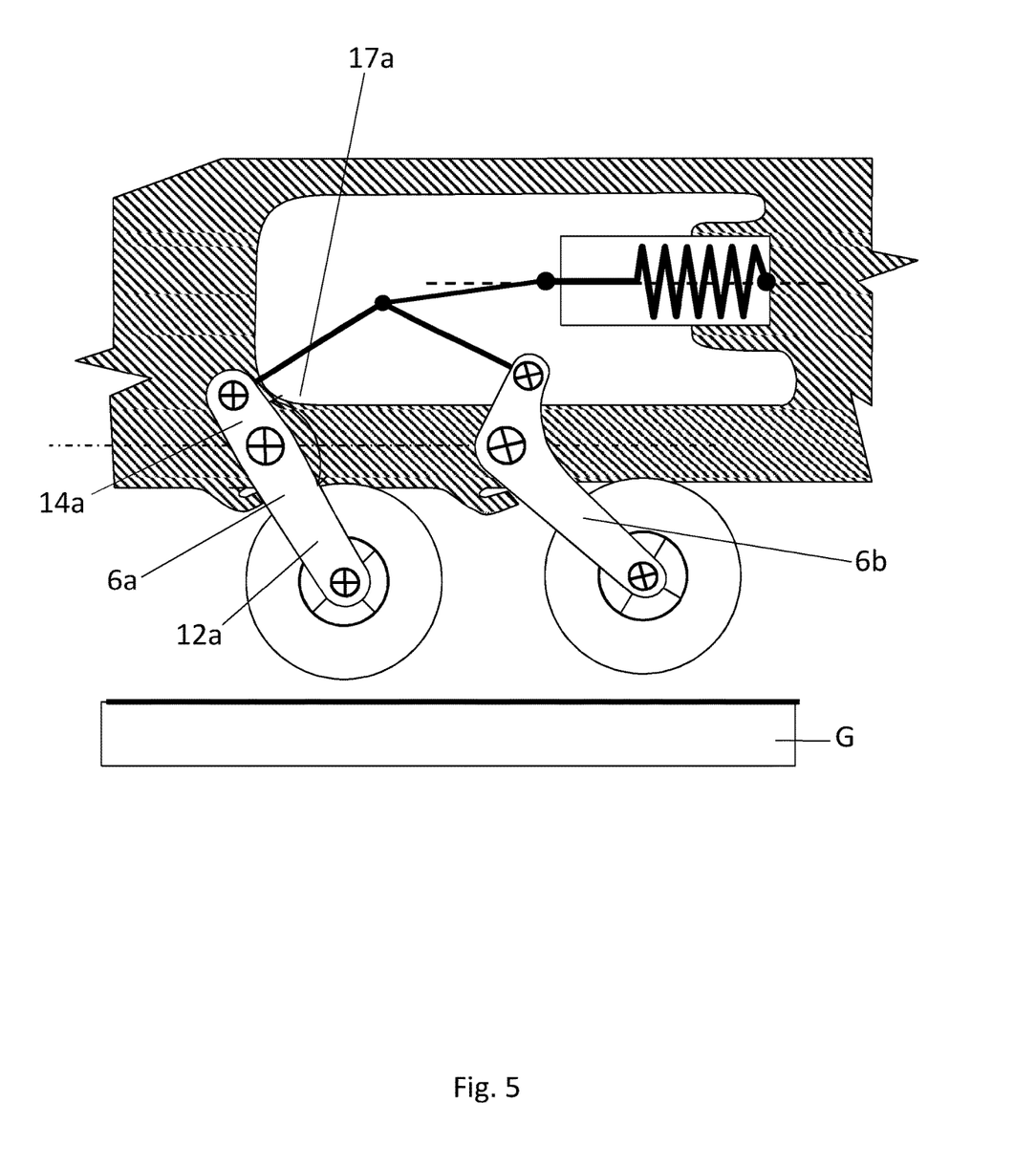
FIG. 5 shows a close up schematic view of a landing gear in accordance with a fourth example embodiment.

FIG. 5 shows a fourth example embodiment of a landing gear in accordance with the present invention. Like reference numerals denote like elements, and only those elements of the landing gear of the fourth embodiment which differ significantly with respect to the third embodiment will be discussed. In the fourth embodiment, the shape of the front arm 6a has been altered such that the longitudinal axis of the lower part 12a and the upper part 14a are substantially in line. Thus, the included link angle 17a of the first arm 6a is approximately 180 degrees.

Figure 6:
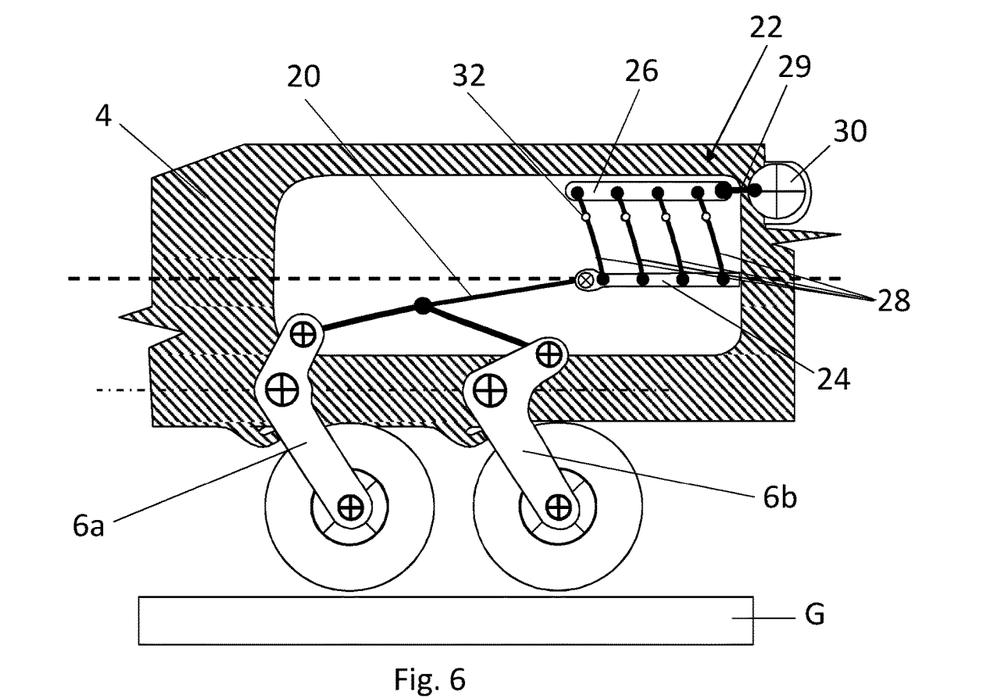
FIG. 6 shows a close up schematic view of a landing gear in accordance with a fifth example embodiment.

FIG. 6 shows a fifth example embodiment of a landing gear in accordance with the present invention. Like reference numerals denote like elements, and only those elements of the landing gear of the fifth embodiment which differ significantly with respect to the first embodiment will be discussed. In FIG. 6 the shock absorber 22 comprises four composite leaf springs 28. The leaf springs 28 are each mounted to a pivot 32 and are arranged side-by-side along the length of the airframe 4 to the rear of the two arms 6a, 6b. The lower end of each leaf spring 28 is mounted on a lower transfer arm 24 which is pivotally connected at the forward end to the main link 20. The upper end of each leaf spring 28 is mounted on an upper transfer arm 26 that is pivotally connected at its rear end to a rotating actuator 30 by a link 29.

In use, prior to landing the landing gear 2 is deployed as shown in FIG. 6. Again, the reaction load exerted on the wheels 8a, 8b by the ground G on landing causes to the arms 6a, 6b to rotate anti-clockwise. The resulting movement of the links 18a, 18b, 20 is resisted by the leaf springs 28, the bottom portion of each of which bends forward as the lower transfer arm 24 moves forward with the movement of the arms 6a, 6b. The further the arms 6a, 6b rotate, the greater the resistance provided by the leaf springs 28. To retract the landing gear, the rotary actuator 30 is rotated, and the fixed length of link 29 causes the link 29 to displace upper transfer arm 26 rearward, thereby causing the leaf springs 28 to pivot around pivot points 32, moving lower transfer arm 24 forward. The displacement of lower transfer arm 24 causes anti-clockwise rotation of the arms 6a, 6b moving the wheels 8a, 8b further up into the airframe 4. In some embodiments, one or more of the leaf springs 28 may be stiffer than another of the leaf springs 28.

Using more than one leaf spring 28 may provide redundancy. Using more than one leaf spring means that the different leaf springs 28 may have different stiffnesses which may provide additional control over the way in which each arm 6a, 6b responds to a given load.

Figure 7:
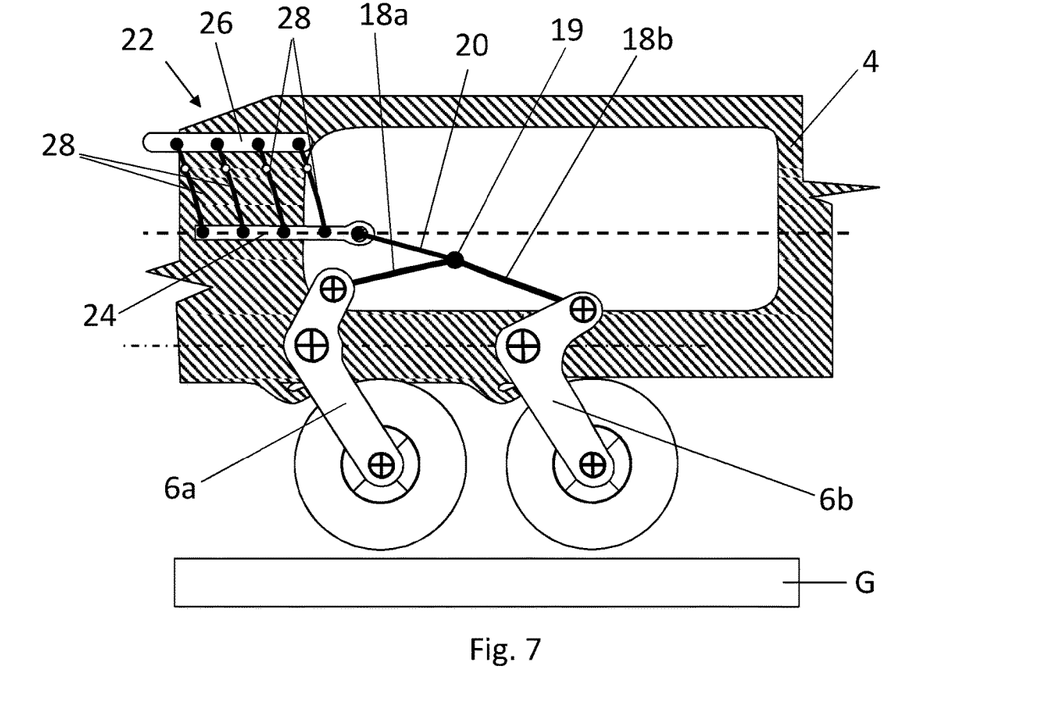
FIG. 7 shows a close up schematic view of a landing gear in accordance with a sixth example embodiment.

FIG. 7 shows a sixth example embodiment of a landing gear in accordance with the present invention. Like reference numerals denote like elements, and only those elements of the landing gear of the sixth embodiment which differ significantly with respect to the fifth embodiment will be discussed. In the sixth embodiment the leaf springs 28 and other elements that make up the shock absorber are located forward of the arms 6a, 6b. The main link 20 now extends forward from pivot point 19 to the rear end of lower transfer arm 24. Thus, landing gear in accordance with the present embodiments may offer additional flexibility regarding the integration of the landing gear components with the fuselage; different locations for, for example, the shock absorber, can be accommodated by changing the geometry of the links 18a, 18b, 20 and pivot point 19. For example, landing gear in accordance with the present embodiments, can, as shown by the sixth embodiment, be rearranged to fit around the airframe.

Figure 8:
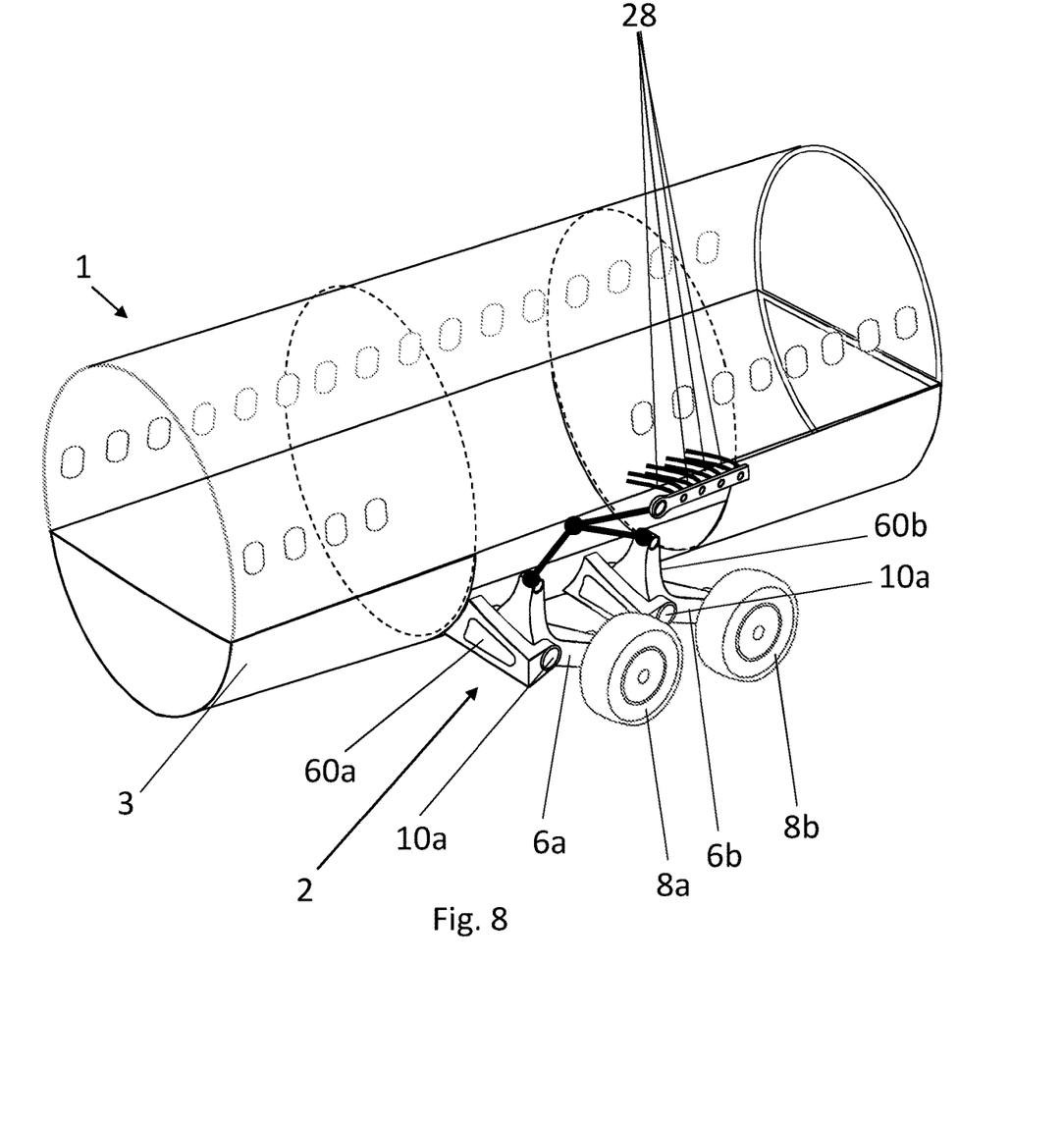
FIG. 8 shows a perspective view of part of an aircraft comprising a landing gear in accordance with a seventh example embodiment.

FIG. 8 shows a perspective view of a landing gear 2 in an accordance with a seventh example embodiment mounted on the fuselage 3 of an aircraft 1. Like reference numerals denote like elements, and only those elements of the landing gear of the seventh embodiment which differ significantly with respect to the fifth embodiment will be discussed. It will be appreciated that, due to the perspective, only one landing gear 2 is visible in FIG. 8 but another landing gear 2 is mounted on the opposite side of the aircraft 1. The forward pivot point 10a to which the forward arm 6a is mounted is provided on a front gear beam 60a extending from the fuselage 3. The rear arm 6b is similarly mounted on a rear gear beam 60b. The longitudinal axis of each leaf spring 28 is rotated 90 degrees inboard in comparison to its position in FIG. 6, such that in the seventh embodiment the longitudinal axis of each leaf spring 28 extends inboard towards the centreline of the airframe 4. Again, the seventh embodiment illustrates the flexibility provided by landing gear in accordance with the present embodiments which may facilitate integration of the landing gear with the aircraft.

Figure 9:
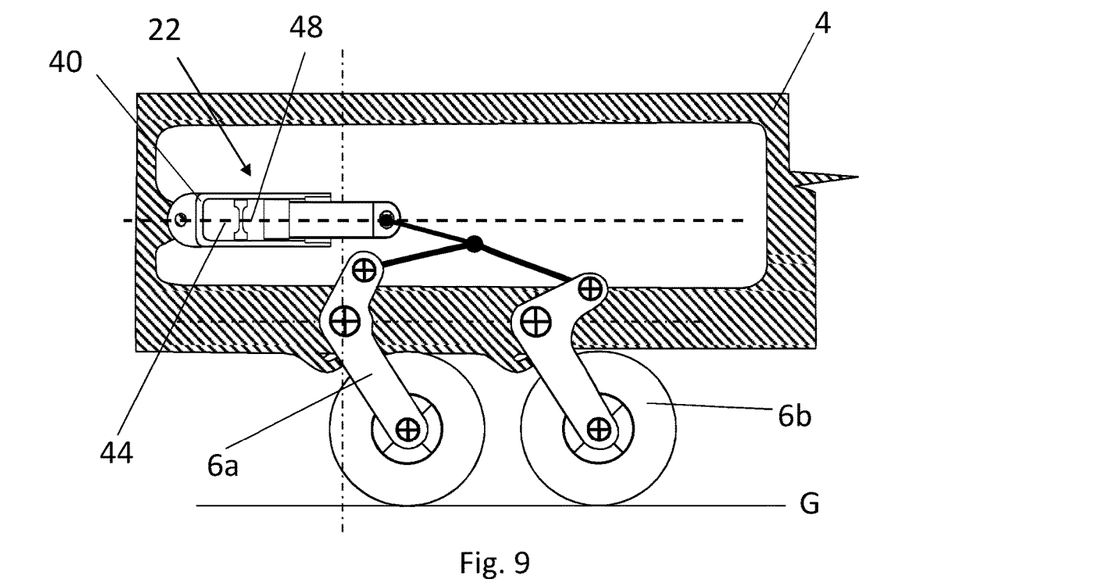
FIG. 9 shows a close up schematic view of a landing gear in accordance with an eighth example embodiment.
Figure 10:
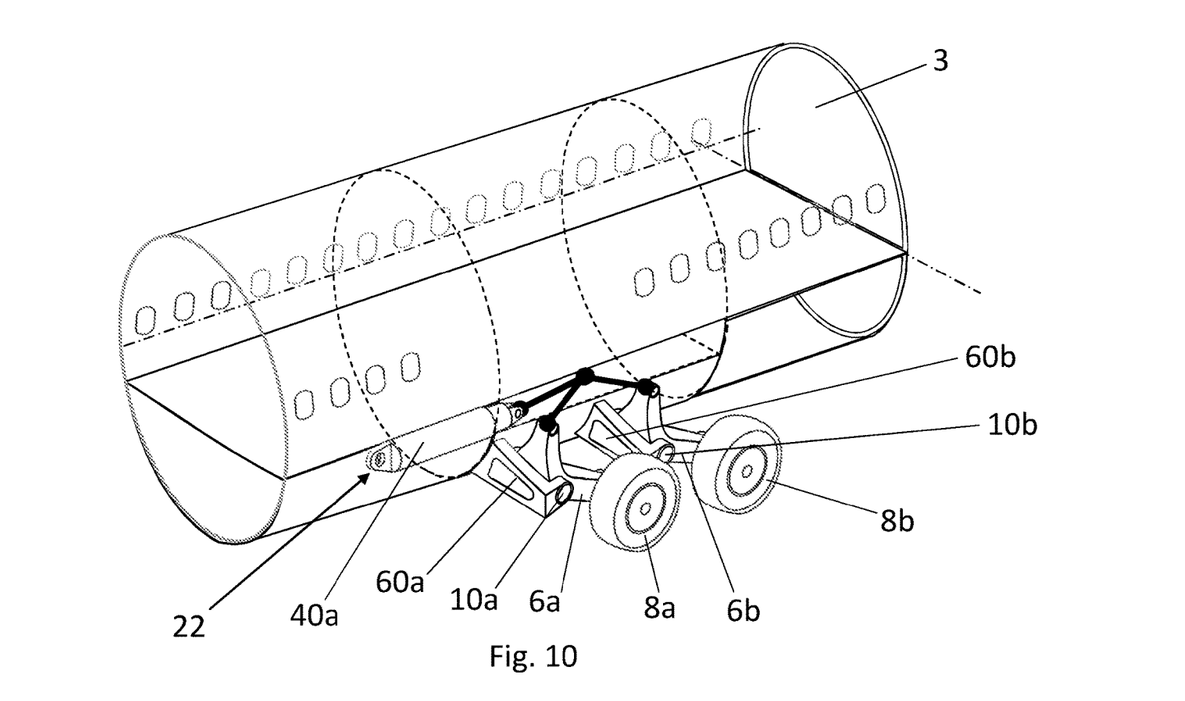
FIG. 10 shows a perspective view of part of an aircraft comprising a landing gear in accordance with the eighth example embodiment.

FIGS. 9 and 10 show an eighth example embodiment of a landing gear in accordance with the present invention. Like reference numerals denote like elements, and only those elements of the landing gear of the eighth embodiment which differ significantly with respect to the first embodiment will be discussed. In the eight embodiment, the shock absorber 22 comprises an oleo type shock absorber 40 comprising a chamber 44 filled with compressed nitrogen and a chamber 48 filled with oil. Oleo struts are well known in the aviation industry and accordingly will not be discussed further here. The oleo 40 is mounted forward of the landing gear arms 6a, 6b. The landing gear comprises an actuator (not shown) connected to the oleo 40. FIG. 10 shows a perspective view of the gear 2 of the eighth embodiment, with arms 6a, 6b mounted to fuselage 3 via gear beams 60a, 60b and the pivots 10a, 10b.

Figure 11:
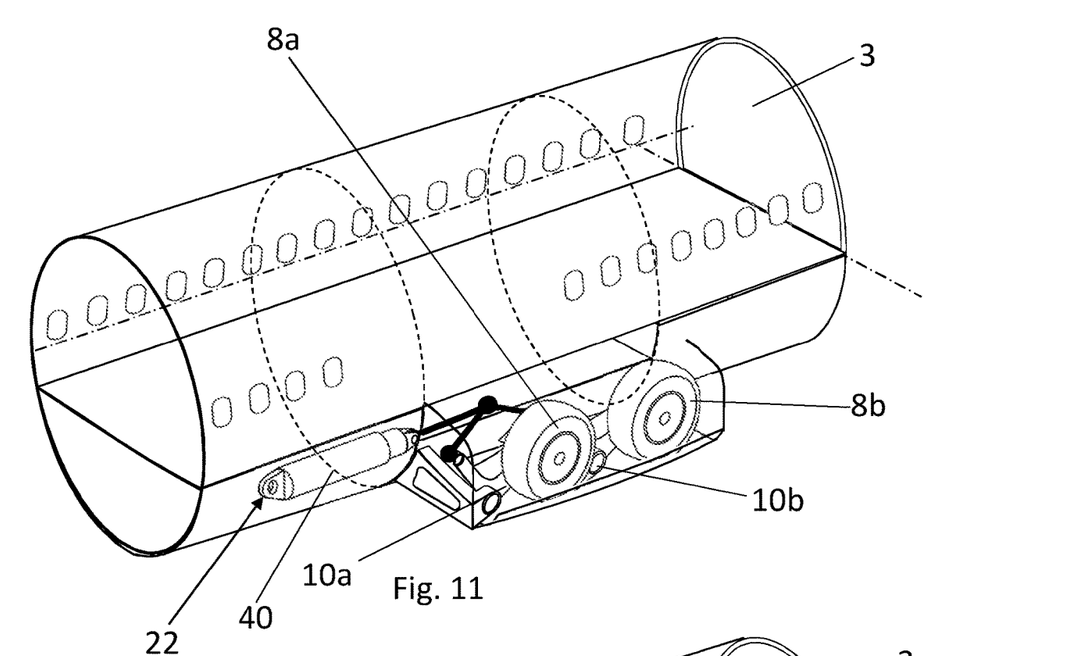
FIGS. 11 and 12 show perspective views of part of an aircraft comprising a landing gear in accordance with the eighth example embodiment following retraction of the landing gear.

FIG. 11 shows the landing gear of the eighth embodiment following retraction via a first retraction kinematic. In FIG. 11 each arm 6a, 6b has been retracted by displacing the oleo 40 forwards using the actuator, thereby rotating the arm anti-clockwise around the corresponding pivot point 10a, 10b. Thus, in the retracted position, the axis of rotation of each wheel 8a, 8b is perpendicular to the yaw axis of the aircraft 1.

Figure 12:
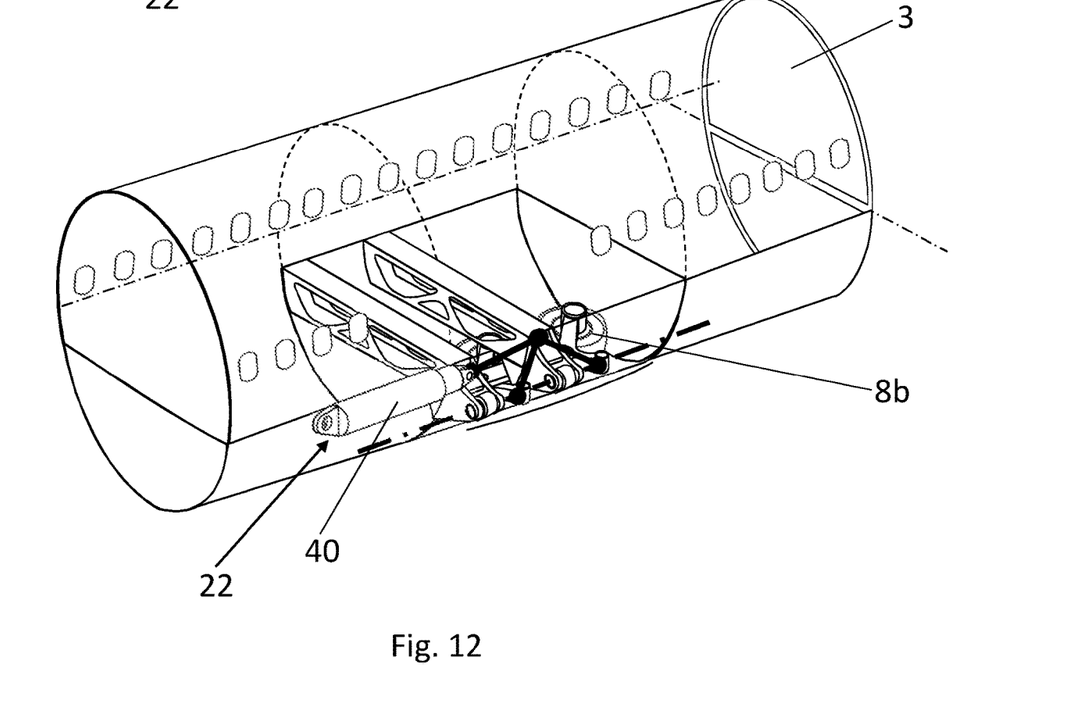

FIG. 12 shows a variation of the landing gear of the eighth embodiment following retraction via a second, different, retraction kinematic. In FIG. 12 each arm 6a, 6b has been retracted by rotating the arm around an axis lying parallel to the longitudinal axis of the airframe 4 (that is lying perpendicular to the pivot axis of the pivot point 10a, 10b). Thus, in the retracted position, the axis of rotation of each wheel is parallel to the yaw axis of the aircraft 1.

Figure 13:
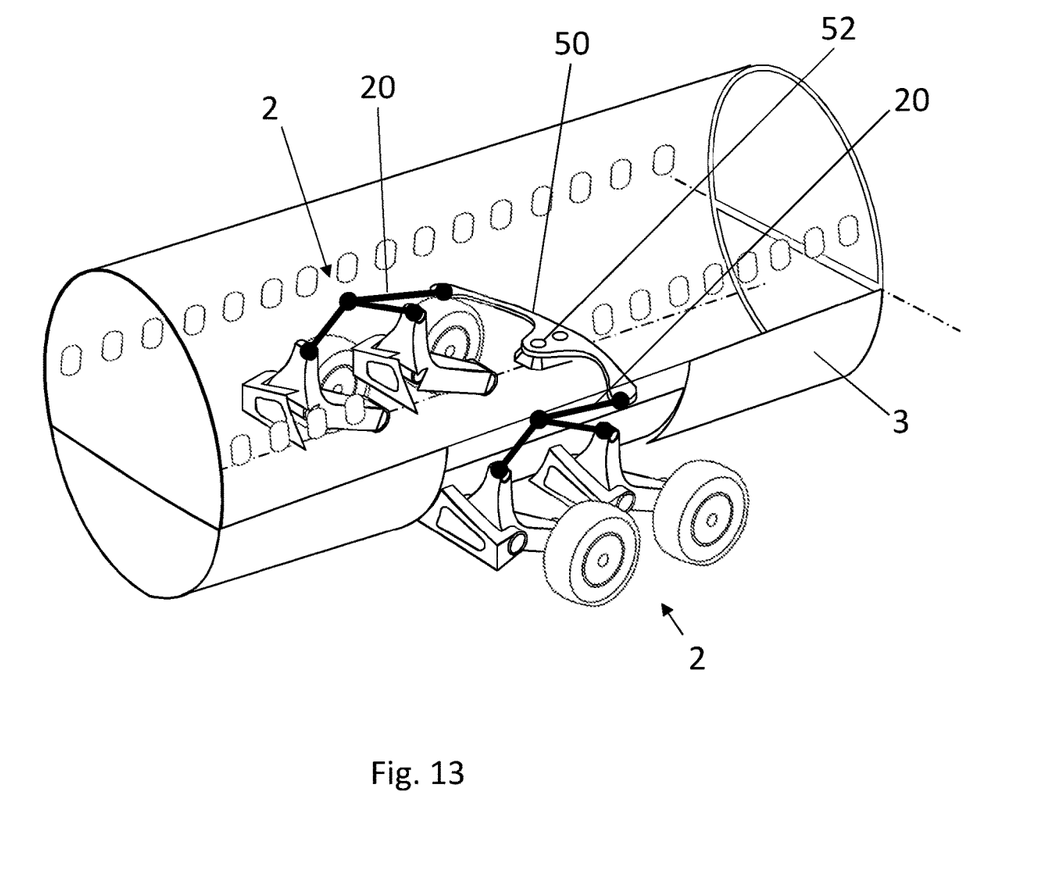
FIG. 13 shows a perspective view of part of an aircraft comprising a landing gear in accordance with a ninth example embodiment.

FIG. 13 shows a ninth example embodiment of a landing gear in accordance with the present invention. Like reference numerals denote like elements, and only those elements of the landing gear of the ninth embodiment which differ significantly with respect to the first embodiment will be discussed. In the ninth embodiment, the shock absorber 22 comprises a single leaf spring 50 which extends across the width of the fuselage 3. A second landing gear 2 is located on the opposite side of the fuselage, and each landing gear 2 is connected to a respective end of the composite leaf spring 50 which is mounted to the fuselage 3 at two mounting points 52 located on the centreline of the fuselage 3. The main link 20 of each landing gear 2 is pivotally connected to an outboard end of the spring 50. Use of a single composite leaf spring as shown in FIG. 13 may reduce the amount of components required and/or facilitate integration of the landing gear with the aircraft.

Whilst the present invention has been described and illustrated with reference to particular embodiments, it will be appreciated by those of ordinary skill in the art that the invention lends itself to many different variations not specifically illustrated herein. For example, there may be more than two wheels per landing gear. In other embodiments there may be more than four leaf springs in the shock absorber, for example in order to accommodate different weight variants of an aircraft.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft landing gear comprising:
   a first arm configured to have one or more wheels mounted at one end, the first arm is mounted to a first pivot;
   a second arm configured to have one or more wheels mounted at one end, the second arm is mounted to a second pivot;
   a first link pivotally coupled to the first arm;
   a second link pivotally coupled to the second arm; and
   a main link pivotally coupled to each of the first and second links and to a shock absorber, the landing gear being configured such that the shock absorber provides a biasing force via (i) the main linkage and the first link which opposes rotation of the first arm about the first pivot and (ii) the main linkage and the second link which opposes rotation of the second arm about the second pivot, and
   wherein the first and second links are pivotally coupled to the same point on the main link.

2. The aircraft landing gear according to claim 1, wherein each of the first and second link is coupled at a first end to an arm, and at a second end to the main link.

3. The aircraft landing gear according to claim 1, wherein the main link is coupled at a first end to each of the first and second links, and at a second end to the shock absorber.

4. The aircraft landing gear according to claim 1, wherein the main link comprises a single member coupled at a first end to the first and second links and at a second end to the shock absorber.

5. The aircraft landing gear according to claim 1, wherein the shock absorber comprises a leaf spring.

6. The aircraft landing gear according to claim 1, wherein the shock absorber comprises a plurality of leaf springs and a transfer arm attached to each of the leaf springs, and wherein the main link is coupled to the transfer arm.

7. The aircraft landing gear according to claim 1, wherein the shock absorber is located further forward than the first and second arms, or the shock absorber is located to the rear of the first and second arms.

8. The aircraft landing gear according to claim 1 in which each of the first and second links is connected to the arm in the region of a first end of a respective arm and a wheel is mounted on each arm in the region of a second end of the respective arm.

9. The aircraft landing gear according to claim 1, wherein each arm comprises a first arm portion and a second portion, the arm being arranged such that together the first and second portions form a bell crank.

10. The aircraft landing gear according to claim 9, wherein an included arm angle is defined between the first portion and the second portion of each arm, and the included arm angle of the first arm is different to the included arm angle of the second arm.

11. A wing assembly comprising a landing gear according to claim 1.

12. An aircraft comprising a landing gear according to claim 1.

13. The aircraft according to claim 12, wherein the landing gear is configured such that each arm retracts by rotating about an axis lying substantially parallel to the pitch axis of the aircraft, or wherein the landing gear is configured such that each arm retracts by rotating about an axis lying substantially parallel to the roll axis of the aircraft.

14. The aircraft according to claim 12, wherein the shock absorber is mounted on the aircraft at a location spaced apart from the first and second arms along the length of the aircraft.

15. An aircraft comprising a first landing gear and a second landing gear according to claim 1, wherein the main link of each of the first and second landing gear is connected to the same shock absorber.

16. A method of reacting a landing gear load using a landing gear comprising:
   a first arm having one or more wheels mounted at one end, the first arm being mounted on a first pivot;
   a second arm having one or more wheels mounted at one end, the second arm being mounted on a second pivot;
   a first link coupled to the first arm;
   a second link coupled to the second arm;
   a main link coupled to each of the first and second links; and
   a shock absorber coupled to the first and second links,
   and wherein, on landing, the ground loads acting on the wheels of the first and/or second arms cause the arms to rotate about the first and second pivots respectively, while the shock absorber acts to oppose that motion via the main link, and each of the first and second links, and
   wherein the first and second links are pivotally coupled to the same point on the main link.

17. The method of reacting a landing gear load according to claim 16, wherein, on landing, during a first time period one of the first and second arms rotates while the other of the first and second arms remains stationary and then, during a second time period both of the first and second arms rotate.

18. A landing gear assembly for an aircraft, the landing gear assembly comprising a first landing gear leg for mounting a wheel thereon, and a second landing gear leg for mounting a wheel thereon, the second landing gear leg being positioned behind the first landing gear leg, each leg being mounted for movement to accommodate ground reaction forces on landing, and a linkage assembly comprising a first link and a second link connecting to both the first and second landing gear legs such that a common link is configured both to (i) provide a force which opposes movement of the first landing gear leg on landing and to (ii) provide a force which opposes movement of the second landing gear leg on landing, and wherein the first and second links are pivotally coupled to the same point on the common link.

19. A landing gear assembly according to claim 18, wherein each leg is in the form of a bell crank.

* * * * *